July 12, 1949.  A. G. H. CARLBOM  2,475,818
VARIABLE LOAD BRAKE FOR RAILWAY CARS
Filed April 30, 1946  2 Sheets-Sheet 1
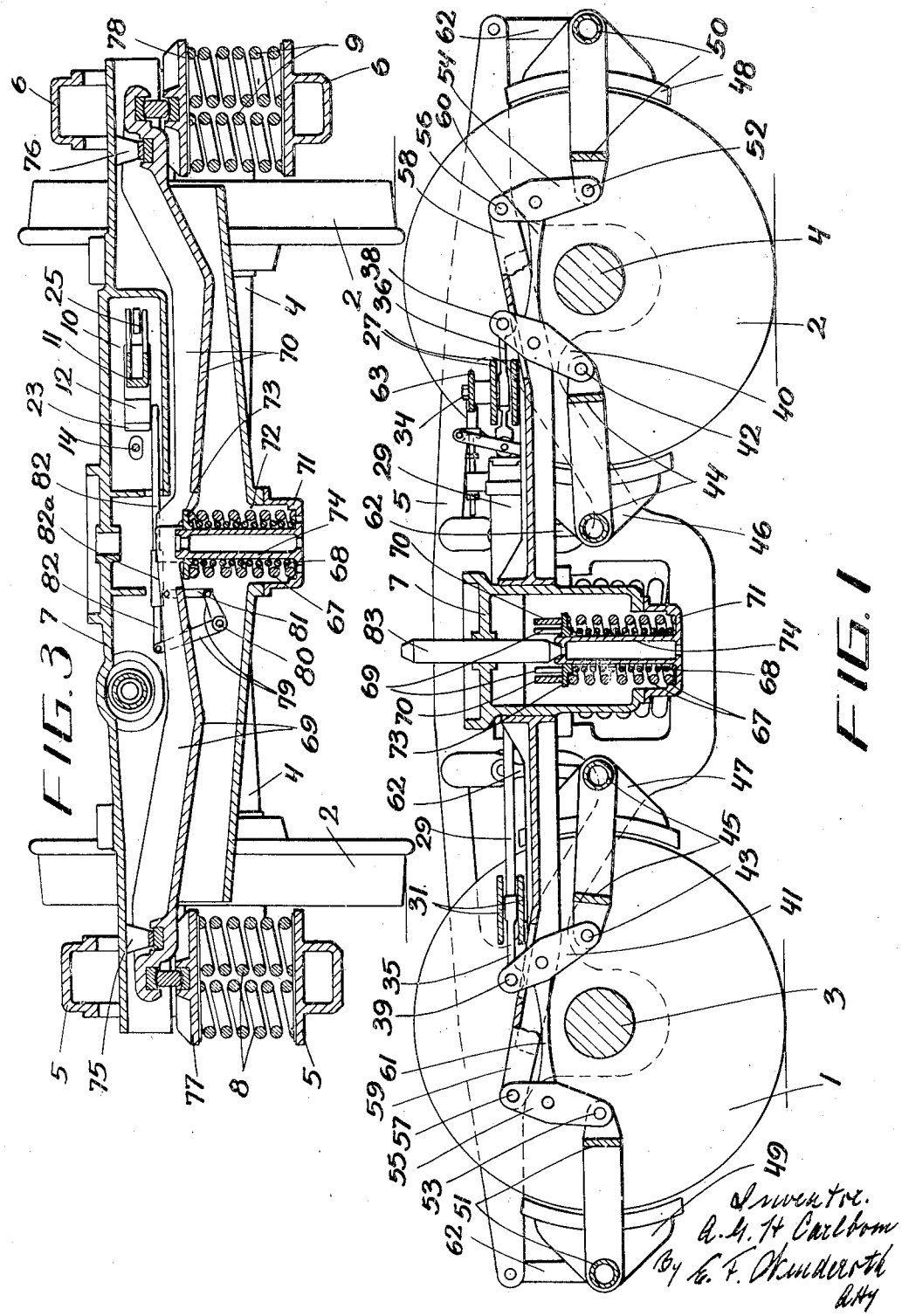

July 12, 1949.     A. G. H. CARLBOM     2,475,818
VARIABLE LOAD BRAKE FOR RAILWAY CARS
Filed April 30, 1946     2 Sheets-Sheet 2
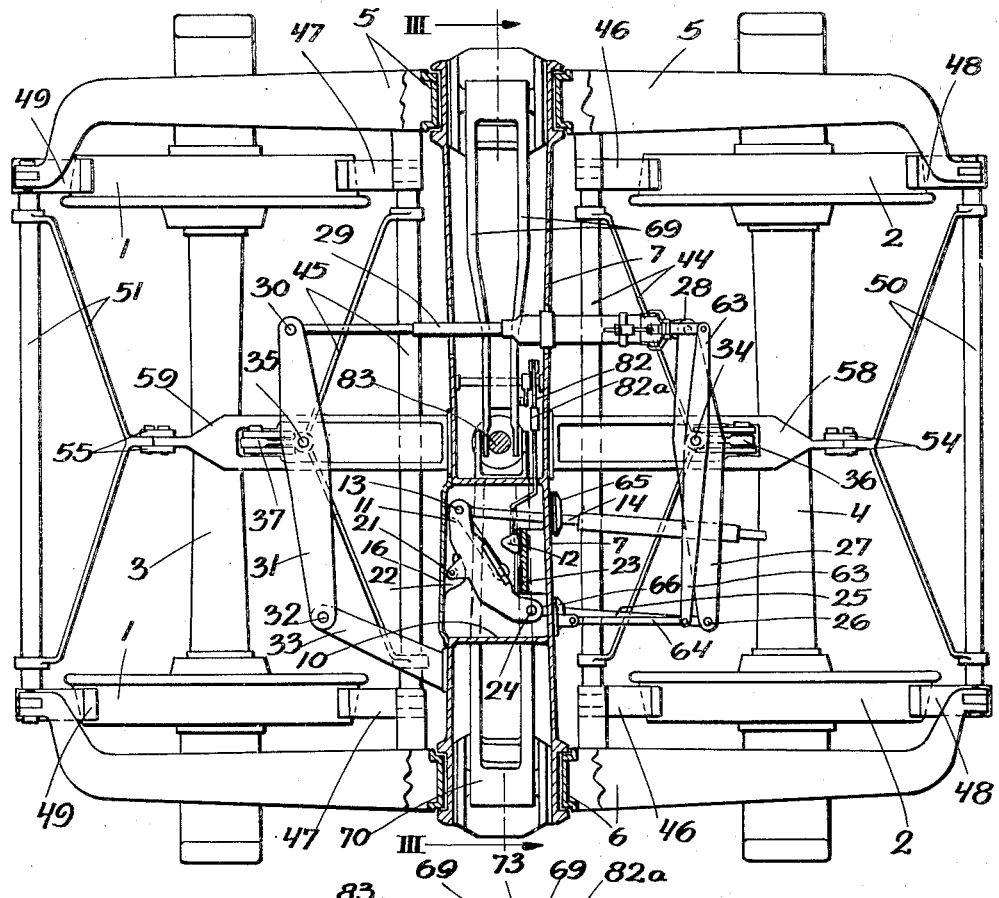
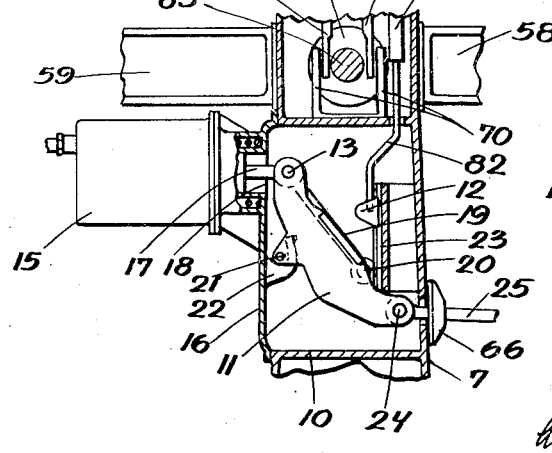

Patented July 12, 1949

2,475,818

UNITED STATES PATENT OFFICE 2,475,818

VARIABLE LOAD BRAKE FOR RAILWAY CARS

Axel Georg Hjalmar Carlbom, Malmo, Sweden, assignor to Svenska Aktiebolaget Bromsregulator, Malmo, Sweden, a corporation of Sweden Application April 30, 1946, Serial No. 666,071

9 Claims. (Cl. 188—195)

This invention relates to railway car brakes and more particularly to variable load brakes in railway cars, especially freight cars, of the type comprising a car body and two swivelling trucks carrying and guiding the car body at the two ends thereof.

The chief object of the invention is to provide an improved car truck brake comprising a brake rigging including a load-controlled variable leverage gear for adjusting the brake applying leverage automatically according to the load of the truck.

A further object of the invention is to provide an improved variable load brake of the load-controlled variable leverage type in a car truck of the conventional type comprising a wheeled frame having two side members, and a crossbeam or bolster carried by and guided in the side members of the frame and supported therefrom by springs.

A further object of the invention is to provide a truck brake comprising a brake rigging including a load-controlled variable leverage gear disposed and housed in the spring-supported bolster of the truck, whereby the bolster and the variable leverage gear may be mounted as a constructional unit on the truck frame.

A further object of the invention is to provide such a mechanism for the load-control of the variable leverage gear as will make this control independent of nonuniform distribution of the load of the truck on the wheels at the two sides of the truck.

A further object of the invention is to provide a truck brake comprising a brake rigging including a variable leverage gear, and mechanism for automatically controlling said gear according to the load of the truck, in which said gear and said mechanism are disposed and housed in the spring-supported bolster of the truck, whereby the bolster and said gear and control mechanism may be mounted as a constructional unit on the truck frame.

For these and such further objects as may become apparent from the following description in which reference is had to the accompanying drawings forming part of this specification, the invention consists in the construction, combination and organization of parts hereinafter described and illustrated by way of examples on the drawings and finally pointed out in the appendant claims.

In the drawings:

Fig. 1 is a longitudinal vertical section of a car truck equipped with my improved variable load brake.

Fig. 2 is a plan view, partly in section, of the truck and the brake equipment thereon, and Fig. 3 is a transverse vertical section substantially on the line III—III in Fig. 2, whereas Fig. 4 is a detail plan view, partly in section, illustrating a modification.

The truck shown in the drawings is of the conventional type comprising a frame with two wheel pairs 1 and 2 having their axles 3 and 4, respectively, journalled in two side members 5 and 6 of the frame, and a crossbeam or bolster 7 carried by and guided in the side members 5 and 6 and supported therefrom by springs 8 and 9, respectively.

Disposed in a housing 10 provided in, and preferably made integral with, the hollow bolster 7 is a variable leverage gear forming part of the brake rigging of the truck and comprising a lever 11 and a shiftable fulcrum 12 therefor. When braking, the brake power is transmitted to one end 13 of the lever 11, which for this purpose may be connected to a brake pull rod 14 (Fig. 2) which may be one of two main brake pull rods extending from a couple of equalizing brake levers associated with a brake cylinder mounted on the car body (not shown) which the swivelling truck is to carry (compare my U. S. application Ser. No. 666,070 filed April 30, 1946, now Patent Number 2,432,467, dated December 9, 1947.

It is also possible to use a separate brake cylinder on each truck. In this case, as shown in Fig. 4, the brake cylinder 15 preferably may be attached to a removable cover 16 closing an opening to the interior of the housing 10 at one side of the spring-supported crossbeam or bolster 7, the end 13 of the lever 11 being connected to the push rod 17 of the brake cylinder, which push rod projects into the housing 10 through an opening 18 in the cover 16.

Preferably the end 13 of the lever 11 is guided in its movement by being connected to an arm 19 pivoted at 20 to the housing 10 (compare the U. S. Patent No. 2,204,925). Further the lever 11 may be provided with a roller 21 or the like coacting with a hook-shaped guiding member 22 in a manner and for purposes explained in the U. S. Patent No. 2,384,257. In the constructional forms shown in Figs. 2 and 4 the said guiding member 22 is mounted on the cover 16. The shiftable fulcrum 12 is movable along a track 23 formed in the housing 10 and extending longitudinally of the bolster 7, and may be guided in its movement by suitable guiding means (not shown) preferably constructed as a laminated brake for arresting the shiftable fulcrum in its position when subjected to pressure from the lever 11 during braking as disclosed in the U. S. Patent application Ser. No. 595,468 to Bert Henry Browall, filed May 23, 1945, now Patent Number 2,427,252, issued September 9, 1947.

The other end 24 of the lever 11 is connected by means of a brake pull rod 25 to one end 26 of a live truck brake lever 27 whose other end 28 is connected by means of a brake pull rod 29 to one end 30 of a dead truck brake lever 31 having its other end 32 pivoted to a bracket 33 on the bolster 7. The levers 27 and 31 are connected between their ends at points 34 and 35, respectively, and by means of links 36 and 37, respectively, to the one end 38 and 39 of levers 40 and 41, respectively. As is best shown in Fig. 1, the levers 40 and 41 have their other ends 42 and 43, respectively, connected to brake beams 44 and 45, respectively, having brake shoes 46 and 47, respectively, disposed inside of, and coacting with, the wheels 2 and 1, respectively. Brake shoes 48 and 49 disposed outside of, and coacting with, the wheels 2 and 1, respectively, are provided on brake beams 50 and 51, respectively, which are connected to the one ends 52 and 53, respectively, of levers 54 and 55, respectively, having their other ends 56 and 57, respectively, pivoted to brackets 58 and 59, respectively, projecting from the bolster 7 towards the two ends of the truck. The levers 40 and 54 are connected to each other at points intermediate their ends by means of a connecting rod 60, and a similar connecting rod 61 interconnects the levers 41 and 55. The brake shoes are suspended by hangers 62 (Fig. 1) from the side members 5 and 6 of the truck frame. Preferably the brake pull rod 29 between the live and dead truck brake levers 27 and 31 consists of an automatic slack adjuster having an operating lever 63 (Fig. 2) pivoted between its ends to the lever 27 in the point 34 and having one end linked to the bolster 7 by means of a link 64, the mechanism of the slack adjuster to be operated being connected to the other end of the operating lever 63. Sliding cover plates 65 and 66 through which the brake pull rods 14 and 25, respectively, project, may be provided for closing the necessary elongated openings for these rods in the wall of the housing 19 which is in the form of a chamber formed in the hollow crossbeams or bolster 7.

Obviously, when braking, the brake applying leverage will be determined by the position of the shiftable fulcrum 12 for the variable leverage lever 11. For adjusting this position along the track 23 automatically according to the load from the car body reposing on the crossbeam or bolster of the swivelling truck, there is a mechanism now to be described. This mechanism is best shown in Fig. 3 and comprises a calibrated spring, preferably in the form of a composite spring composed of two coiled compression springs 67 and 68 of different dimensions, working in parallel and preferably arranged one within the other as shown, which spring 67, 68 by means of two levers 69 and 70 balances part of the weight of the bolster 7 and the load thereon reposing on the supporting springs 8 and 9 at the two sides of the truck. The balancing spring 67, 68 and levers 69 and 70 are disposed and housed in the bolster 7. The levers 69 and 70 extend within the bolster from the ends thereof to the spring 67, 68 which is situated midway between the ends of the bolster and is inserted and acts between a cup-shaped lower supporting member 71 closing an insertion opening 72 in the bottom of the hollow bolster 7 and removably attached thereto, and an upper thrust plate 73 movable vertically on a central stud 74 projecting from the bottom of the cup 71 and guiding the surrounding spring 67, 68. The spring thrust plate 73 resiliently supports the inner ends of the two levers 69 and 70 which a short distance from their outer ends are fulcrumed to the bolster 7 as shown at 75 and 76, respectively. At their outer ends the levers 69 and 67 repose on vertically movable thrust plates 77 and 78, respectively, on top of the supporting springs 8 and 9, respectively, so that the levers 69 and 70 support the bolster 7 from the supporting springs 8 and 9.

It is important to note that the two levers 69, 70 will compress the balancing spring 67, 68 by a force which is derived from the loads on the supporting springs 8 and 9 at both sides of the truck and is proportional to the sum of these loads independently of any possible nonuniform distribution of the weight of the bolster and the car body carried thereby on the supporting springs 8 and 9 at the two sides of the truck. Obviously the balancing spring 67, 68 resiliently yields to this force from the levers 69, 70, and the yielding movements are transmitted by a link and lever system to the shiftable fulcrum 12 for adjusting the position thereof according to the load on the truck so as to increase the brake applying leverage of the variable leverage lever 11 with increasing load on the truck. In the constructional form shown said link and lever system comprises a bell crank lever 79 which is pivoted to the bolster 7 at 80 and has one arm linked by means of a link 81 to one of the levers 69, 70, and the other arm connected with the shiftable fulcrum 12 by means of a link rod 82. This rod 82 may include a member 82a capable of yielding to the movements of the lever 79 when the fulcrum 12 is blocked against movement during a braking operation. Preferably the rod 82 also should be adjustable in respect of its length in order to allow for adjustment of the position of the shiftable fulcrum 12 so as to correspond properly to a given vehicle load.

In the center of the bolster 7 is provided the center pin 83 (Figs. 1 and 2) about which the truck swivels in relation to the car body carried thereby. In the constructional form shown the levers 69 and 70 whose inner ends extend a little beyond each other, are fork-shaped and straddle the pin 83.

As will be understood from the foregoing description taken in connection with the drawings, the bolster 7 and the variable leverage gear 11, 12 as well as the load-control mechanism for the shiftable fulcrum 12, which mechanism comprises the balancing spring 67, 68 and levers 69 and 70 and the link and lever system 79—82, and possibly also the brake cylinder 15 (Fig. 4), may be assembled and then mounted as a constructional unit in the frame of the truck.

The details of the construction herein shown and described for the purpose of illustrating the invention may be varied and substituted by equivalents within wide limits without departing from the spirit of the invention or the scope of the appendant claims.

What I claim and desire to secure by Letters Patent is:

1. In a variable load brake for a car-truck comprising a wheeled frame, a movable car-supporting bolster carried and guided by said frame, springs supporting said bolster from said frame at both sides of the truck, a hollow crossbeam forming said movable car-supporting bolster, a truck brake rigging on the truck, a variable leverage gear comprising a variable leverage brake lever and a shiftable fulcrum therefor forming parts of said truck brake rigging for varying the brake applying leverage thereof, said leverage gear being housed in and carried by said movable car-supporting crossbeam so as to partake in the movements thereof, other parts of said truck brake rigging being mounted on said frame, and mechanism mounted and housed in said movable hollow crossbeam for adjusting the position of said shiftable fulcrum in relation to said movable crossbeam automatically according to the load reposing on said supporting springs.

2. In a variable load brake for a car-truck comprising a wheeled frame having two side members, a movable car-supporting bolster extending transversely of said frame and carried and guided by said side members, and springs supporting said bolster from said side members, a hollow crossbeam forming said bolster, a brake rigging including a variable leverage gear comprising a variable leverage brake lever and a shiftable fulcrum therefor, a chamber formed in said hollow crossbeam integrally therewith and housing said variable leverage gear, a removable cover closing said chamber at one side of said crossbeam, a brake cylinder attached to said cover, a push rod projecting from said brake cylinder through said cover into said chamber and having its projecting end connected to one end of said variable leverage brake lever, and mechanism for adjusting the position of said shiftable fulcrum automatically according to the load reposing on said supporting springs, said mechanism being disposed in said hollow crossbeam.

3. In a variable load brake for a car-truck comprising a wheeled frame, a movable car-supporting bolster extending transversely of said frame and having its ends carried and guided therein, springs supporting said bolster from said frame at both sides thereof, a truck brake rigging on the truck, a track provided on said movable bolster and extending longitudinally thereof transversely of said frame, a variable leverage brake lever, a shiftable fulcrum for said lever, said fulcrum being shiftable along said track and supported thereby, said variable leverage brake lever and said shiftable fulcrum therefor constituting a variable leverage gear carried by and partaking in the movements of said movable bolster forming parts of said truck brake rigging for varying the brake applying leverage thereof, other parts of said truck brake rigging being mounted on said frame, and means for adjusting the position of said shiftable fulcrum in relation to said movable bolster along said track thereon automatically according to the load reposing on said supporting springs.

4. In a variable load brake for a car-truck comprising a wheeled frame having two side members, a movable car-supporting bolster extending transversely of said frame and having its ends carried and guided by said side members, springs supporting said movable bolster from said side members, a hollow crossbeam forming said bolster and providing inside thereof a track extending longitudinally of said crossbeam transversely of said frame, a variable leverage brake lever and a shiftable fulcrum therefor housed in and carried by said movable hollow crossbeam so as to partake in the movements thereof, said fulcrum being shiftable along and supported by said track inside of said hollow crossbeam, said variable leverage brake lever and said fulcrum therefor forming parts of said truck brake rigging for varying the brake applying leverage thereof, other parts of said truck brake rigging being mounted on said frame, and mechanism mounted and housed in said movable hollow crossbeam for adjusting the position of said shiftable fulcrum in relation to said hollow crossbeam along said track therein automatically according to the load reposing on said supporting springs.

5. In a variable load brake for a car-truck comprising a wheeled frame having two side members, a movable car-supporting bolster extending between and carried and guided by said side members, and springs supporting said movable bolster from said side members, a brake rigging including a variable leverage gear mounted on said movable bolster and comprising a variable leverage brake lever and a shiftable fulcrum therefor, and means for adjusting the position of said shiftable fulcrum in relation to said movable bolster automatically according to the load reposing on said supporting springs, said means comprising a spring disposed at the center of said movable bolster nad supported thereby, and two levers extending longitudinally of said movable bolster and having outer ends reposing on said supporting springs and inner ends supported from said movable bolster by said centrally disposed spring, said two levers being fulcrumed to said movable bolster at short distances from said outer ends.

6. In a variable load brake for a car-truck comprising a wheeled frame having two side members, a movable car-supporting bolster extending between said side members and carried and guided by them, and springs supporting said bolster from said side members, a hollow crossbeam forming said movable bolster, a brake rigging including a variable leverage gear mounted and housed in said hollow crossbeam and comprising a variable leverage brake lever and a shiftable fulcrum therefor, and means for adjusting the position of said shiftable fulcrum automatically according to the load reposing on said supporting springs, said means comprising a spring disposed centrally in said hollow crossbeam, two levers disposed in said hollow crossbeam and having outer ends reposing on said supporting springs and inner ends supported by said centrally disposed spring, said two levers being fulcrumed to said crossbeam at short distances from said outer ends, and a link and lever system for transmitting yielding movements of said centrally disposed spring to said shiftable fulcrum for the adjustment thereof.

7. In a variable load brake for a car-truck as claimed in claim 6, the additional feature that said hollow crossbeam has a center pin to swivel about in relation to the body of the car, and that said inner ends of said two levers supported by said centrally disposed spring project beyond each other and are fork-shaped and straddle said center pin.

8. In a variable load brake as claimed in claim 6, the additional feature that said centrally disposed spring is a compression spring inserted and acting between a cup-shaped member closing an insertion opening in the bottom of said hollow crossbeam, and a thrust plate which supports said inner ends of said two levers and is vertically movable on a central stud projecting from the bottom of said cup-shaped member and guiding said thrust plate and said centrally disposed spring.

9. In a variable load brake as claimed in claim 6, the additional feature that said link and lever system comprises a bell crank lever pivotally mounted in said hollow crossbeam, a link connecting one arm of said bell crank lever to the inner end of one of said two levers supported by said centrally disposed spring, and a link rod connecting said shiftable fulcrum to the other arm of said bell crank lever.

AXEL GEORG HJALMAR CARLBOM.

REFERENCES CITED

The following references are of record in the file of this patent:

UNITED STATES PATENTS

| Number | Name | Date |
|---|---|---|
| 1,002,312 | Ransom | Sept. 5, 1911 |
| 2,367,586 | Kelley | Jan. 16, 1945 |
| 2,394,038 | Browall | Feb. 5, 1946 |